Jan. 13, 1931.                L. C. DOANE                1,788,945
                      SHOCK ABSORBER FOR LAMP SOCKETS
                           Filed Feb. 26, 1929
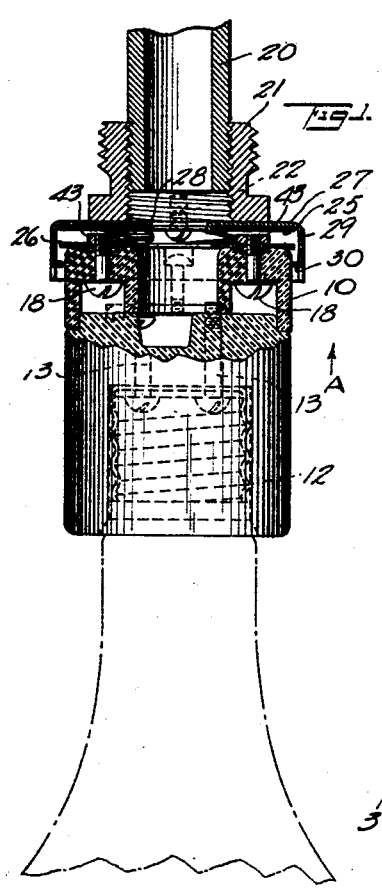
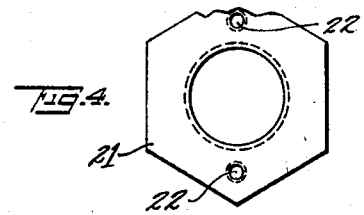
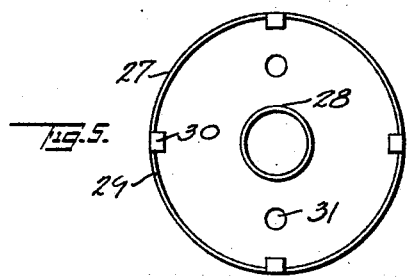
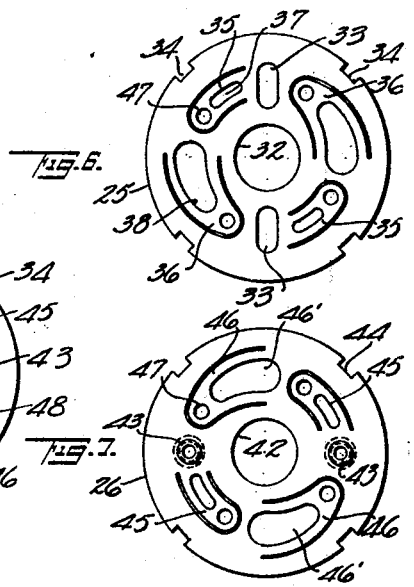
INVENTOR.
Leroy C Doane
BY
ATTORNEY Patented Jan. 13, 1931

1,788,945

UNITED STATES PATENT OFFICE

LEROY C. DOANE, OF MERIDEN, CONNECTICUT, ASSIGNOR TO THE MILLER COMPANY, OF MERIDEN, CONNECTICUT, A CORPORATION OF CONNECTICUT

SHOCK ABSORBER FOR LAMP SOCKETS

Application filed February 26, 1929. Serial No. 342,797.

The present invention relates to shock absorbers for lamp sockets and is more particularly directed toward a shock absorber for supporting lamp sockets in locations in which electrical lamps are subject to vibration, as for example, in factories, loft buildings, and the like.

The present invention contemplates a shock absorber which is capable of being interposed between a fixed support such as a suspension element for fixtures, and the lamp socket, the device being so designed and arranged that it takes up very little space, is inconspicuous, capable of ready assembly and unlikely to get out of order or require attention.

According to the preferred form of the construction, the present invention may readily be embodied in the form of sheet metal stampings secured together and to which the lamp socket may be secured in such a manner that the socket and shock absorbing device may be readily connected to the suspension element such as the pipe. The lower part of the socket may be readily removed and wiring effected in the same manner as though the shock absorber were not present.

The accompanying drawings show, for purposes of illustrating the present invention, one of the many possible embodiments in which it may take form, it being understood that the drawings are illustrative of the invention rather than limiting the same.

In these drawings:

Figure 1 is a sectional view through a preferred form of construction;

Figure 2 is an elevational view taken in the direction of the arrow A of Figure 1 showing the spring elements;

Figure 3 is a section taken on the line 3—3 of Figure 2 showing the manner in which the spring elements are secured together; and Figures 4 to 8, inclusive, are elevational views taken in the direction of the arrow A of Figure 1, Figure 4 showing the attachment stud for securing the socket and shock absorber to a fixed support, Figure 5 showing the cap or cover member for the shock absorbing device, Figures 6 and 7 showing the stampings employed in making up the unit shown in Figure 7, and Figure 8 showing a face view of a socket part.

For convenience, in describing the present invention, it is shown as embodied in a form of construction suitable for securing porcelain lamp sockets to fixture supports such as a length of pipe. Such a socket may consist of two porcelain parts 10 and 11 with the usual socket contacts 12 for cooperation with a lamp base. These contacts are connected by screws 13 which pass through the lower insulating part 11 and thread into terminals 14 on the upper porcelain part. These latter mentioned terminals have binding posts 15 to receive wires adapted to be brought in through the center hole 16 in the usual manner. The upper porcelain part 10 of the socket is provided with holes 17 adapted to receive fastening screws 18 with which the upper part of the socket is to be secured to some supporting device.

The suspension element of the lighting unit is indicated at 20 in the form of a piece of pipe onto which a stud 21 is threaded, as shown in Figures 1 and 4. This stud may have an hexagonal head and be threaded as indicated. This stud is provided with two tapped holes indicated at 22 which may be spaced the same as the holes 17 and adapted to receive the screws 18 when no shock absorber is employed.

The present invention, however, as above indicated, contemplates the inclusion of a shock absorbing device between the parts 10 and 21. In the form of construction herein shown, the shock absorbing device consists essentially of two sheet metal stampings 25 and 26 shown in Figures 6 and 7. These two stampings are permanently secured together, the one being connected to the socket part, while the other is adapted to be connected to the support.

In the preferred form of construction, an intermediate stamping 27 shown in Figures 1 and 5 is employed to cover the resilient parts 25 and 26. This stamping is provided with a downwardly drawn central hole 28 approximately the same diameter as the hole 16 in the porcelain part and adapted to guide the wires as they are passed down into the socket. The stamping 27 also has a peripheral skirt 29 somewhat larger in diameter than the socket parts and adapted to receive the same. This skirt 27 has, as here shown, four inwardly bent projections 30 and the stamping is provided with holes 31 spaced the same as the tapped holes 22.

The stamping 25 shown in Figure 6 is of general circular shape slightly smaller in diameter than the inside of the skirt 29. This stamping 25 is provided with a center wire receiving hole or passage 32 through which the downwardly drawn part 28 of the stamping 27 may project. The stamping 25 is provided with holes 33 spaced the same as the holes 31 and 22 and with notches 34 spaced the same as the projections 30. In the stamping 25, these notches are definitely spaced relative to the holes and the projections on the stamping 27. The stamping 25 is provided with four tongues arranged in pairs 35—35 and 36—36. These tongues may be cut from material of the stamping as indicated in Figures 1 and 3. These tongues may be provided with punched out holes as indicated at 37 and 38 if desired.

The stamping 26 is somewhat similar to the stamping 25, is of the same size, and is provided with the central hole 42 and outer notches 44 spaced the same as the former stamping. This stamping 26 has pairs of spring tongues 45 and 46 similar to the spring tongues 35 and 36. These tongues are all bent upwardly as indicated in Figures 1 and 3. The internally threaded bushings 43 are permanently secured to the stamping 26 by riveting. These bushings are spaced the same as the holes 17 in the socket part 10 and are adapted to enter into the large slots 38 in the stamping 25. The tongues 35 and 36, 45 and 46 are provided with holes 47 and the two stampings 25 and 26 are secured together by rivets 48 passed through the holes in the spring tongues. It will be noted that the long tongues on one disk are secured to the short tongues on the other disk, also that the rivets 48 are about 90° apart. The stampings shown in Figures 6 and 7 are made out of resilient sheet material and when the stampings are secured together a shock absorbing unit is produced as indicated in Figures 1 and 2.

The assembly of the parts which have been described takes place in the following manner:

The unit shown in Figure 2 is placed into the cap or cover stamping 27 by causing the notches 34 and 44 to register with the prongs 30. The shock absorber is then turned about so that the holes 33 in the stamping 25 register with the holes 31 in the cover. Screws may then be inserted in place and tightened up to hold the shock absorbing unit and cover against the stud 21. The heads of these screws are accessible through the large hole 46' in the spring tongues 46. The upper part 10 of the porcelain socket may then be secured in place by passing screws 18 through the holes 17 in the part 10 and threading these screws into the bushings 43. The wires may then be passed down to the contacts, secured in place and the lower part 11 of the socket may be fastened to the upper part.

If desired, the cover plate 27 may be omitted and the upper shock absorbing spring connected directly with the support.

The present form of construction is especially adapted for providing a resilient support for lamp sockets in places subject to excessive vibration. The device is very easily assembled, permits the socket to move to a considerable extent in all directions thereby preventing the transmission of shocks from the support to the lamp bulb. The shock absorbing springs not only support a lamp socket and bulb but form a connection which takes up the twist occasioned by turning the lamp into or out of the socket. The thinness of the device makes it possible to employ the shock absorber in fixtures without redesign of the parts to accommodate the shock absorber. It is obvious that the invention may be embodied in many forms and constructions within the scope of the claims, and I wish it to be understood that the particular form is but one of the many forms. Various modifications and changes being possible, I do not otherwise limit myself in any way with respect thereto.

I claim:

1. In combination, a fixed support, a lamp socket, and a shock absorber supporting the lamp socket from the support, the shock absorber being in the form of a wafer-like assembly of two sheet metal disks secured together, the disks providing for slight vertical or tilting movement of the socket relative to the support, and preventing rotary movement, and a fixedly supported shock absorber cover member surrounding and concealing the shock absorber and having projections engageable with the shock absorber to limit vertical movement.

2. In combination, a fixed support, a lamp socket, and a shock absorber supporting the lamp socket from the support, the shock absorber being in the form of a wafer-like assembly of two sheet metal disks each having integral spring tongues cut from the material of the disk, the spring tongues being secured together, the body of one stamping being secured to the support while the body of the other stamping is secured to the socket.

3. A resilient support for lamp sockets comprising a fixed disk having a plurality of downwardly depressed spring tongues, a dependent element carrying a disk having upwardly pressed spring tongues placed opposite the other tongues and secured at their ends to the ends of the upper tongues.

4. A resilient support for lamp sockets comprising a fixed disk having a plurality of downwardly depressed spring tongues, a dependent element carrying a disk having upwardly pressed spring tongues placed opposite the other tongues and secured at their ends to the ends of the upper tongues, the tongues being arranged so that their ends are approximately 90° apart, whereby the socket may tilt in any direction.

5. A shock absorber for lamp sockets and the like, comprising, a wafer-like assembly of two sheet metal disks, each having spring tongues bent toward the other disk, the ends of the opposite tongues being secured together, one disk having holes for attaching screws, the other disk having larger holes opposite the first holes to permit passing screws into place, the said other disk also having threaded bushings.

6. In a shock absorber, a pair of sheet metal disks each having arc-shaped spring tongues struck out of the body of the disk and pressed toward corresponding tongues on the other disk, and rivets securing the ends of the tongues of each pair together.

7. In a shock absorber, a pair of sheet metal disks each having arc-shaped spring tongues struck out of the body of the disk and pressed toward coresponding tongues on the other disk, and rivets securing the ends of the tongues of each pair together, the disk being provided with means to permit securing one disk to a fixed part and the other disk to a supported part.

8. In combination, a fixed tubular supporting member, an apertured cover member, a shock absorber in the form of two sheet metal disks having spring tongues secured together, the upper disk and cover member being secured to the support, and a lamp socket secured to the lower disk, the disks being apertured so that wires may be passed from the supporting member to the socket.

9. A shock absorber adapted to be interposed between a lamp socket and its support, said shock absorber comprising two sheet metal disks secured together and to the support and socket so as to support the socket, the interconnections between the disks being such that the socket may tilt in any direction or may move axially, the socket being held against angular movement about the axis.

10. In a shock absorber for lamp sockets, in combination, a fixed socket supporting member, a sheet metal disk secured to the supporting member, said disk having spring tongues, a second disk having spring tongues secured to the tongues on the first disk, and a socket secured to the second disk.

11. In a shock absorber for lamp sockets, in combination, a fixed socket supporting member, a sheet metal disk secured to the supporting member, said disk having spring tongues, a second disk having spring tongues secured to the tongues on the first disk, a socket secured to the second disk, and a retainer secured to the supporting member and limiting the axial movement of the socket.

12. In a shock absorber for lamp sockets, in combination, a fixed support, an inverted cup-shaped stamping carried below the support and having internally directed prongs near its lower end, a shock absorber assembly comprising two closely spaced sheet metal disks having spring tongues secured together, screws for fixedly securing the upper disk and stamping to the support, the lower disk carrying threaded bushings, a lamp socket, and screws threaded into the bushings for securing the socket to the lower disk, the disks being notched to permit passing the assembly by the prongs in the stamping, the parts being assembled with the prongs and notches out of registry so that the prongs limit downward movement of the socket relative to the support.

13. In a shock absorber for lamp sockets, a pair of sheet metal disks each having alternate long and short arc-shaped tongues struck out of the body of the disk and extending toward the other disk, the long tongues from one disk being secured to the short tongues of the other disk, the disk having fastening holes between the tips of the long tongues and the roots of the short tongues.

14. In a shock absorber for lamp sockets, a pair of sheet metal disks each having alternate long and short arc-shaped tongues struck out of the body of the disk and extending toward the other disk, the long tongues from one disk being secured to the short tongues of the other disk, the disk having fastening holes between the tips of the long tongues and the roots of the short tongues, said holes being spaced approximately 90° apart whereby the parts are flexible about two planes at right angles to one another.

Signed at Meriden, in the county of New Haven and State of Connecticut, this 21st day of February, 1929.

LEROY C. DOANE.